Oct. 29, 1940.  J. A. SCHEUTZ  2,219,943
VEHICLE BUMPER
Filed Oct. 22, 1938
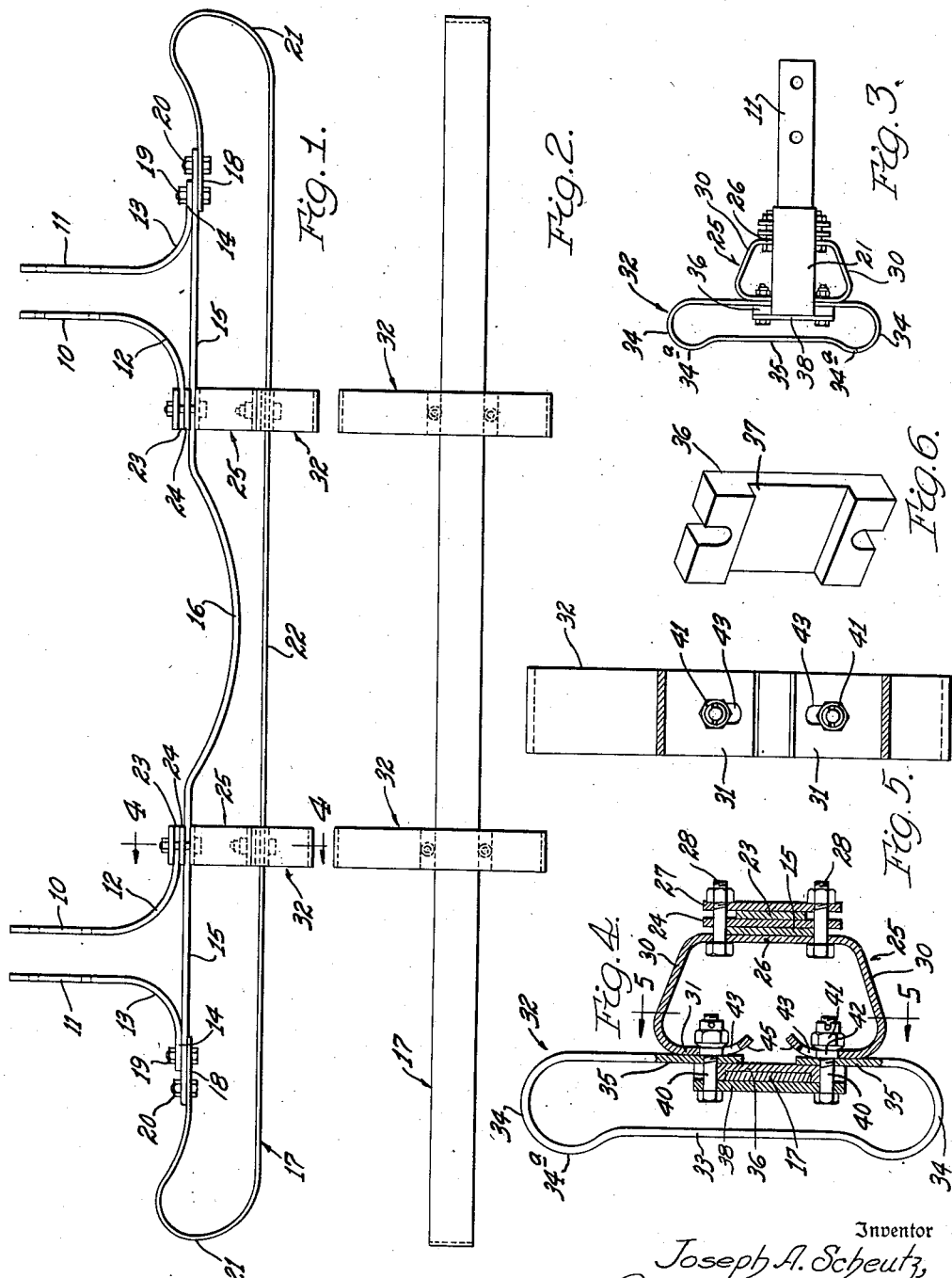
Inventor
Joseph A. Scheutz,
By 
Attorneys Patented Oct. 29, 1940

2,219,943

UNITED STATES PATENT OFFICE 2,219,943

VEHICLE BUMPER

Joseph A. Scheutz, Hazel Park, Mich.

Application October 22, 1938, Serial No. 236,374

4 Claims. (Cl. 293—55)

This invention relates generally to bumpers and more particularly to bumpers for motor vehicles.

One of the objects of the present invention is to provide a new and improved motor vehicle bumper having high cushioning characteristics and yet one which is strong and durable.

Another object of the invention is to provide a new and improved motor vehicle bumper so constructed as to absorb shocks with increasing resistance in accordance with the magnitude of the shocks.

Another object of the invention is to provide a new and improved bumper so constructed that shocks received thereby are gradually diminished over a wide range of shock absorption.

Other objects of the invention will become apparent from the following description taken in connection with the accompanying drawing in which—

Figure 1 is a top plan view of my improved bumper;

Fig. 2 is a front view of the bumper;

Fig. 3 is an end view of the bumper;

Fig. 4 is a view in section showing certain details of the bumper construction;

Fig. 5 is a view partly in elevation and partly in section of the bumper, taken along the line and in the direction of the arrows 5—5 of Fig. 4, and Fig. 6 is a perspective view of a part of the bumper structure shown removed therefrom.

Referring to the drawing by characters of reference, the bumper shown includes two spaced pairs of like supporting members each pair of which comprises an inner supporting member 10 and an outer supporting member 11 spaced to receive vehicle side frame members (not shown) to which the supporting members may be riveted or be otherwise suitably secured thereto. The supporting members 10, 11, are formed with substantially parallel rear end portions but forwardly the inner supporting members 10 bend inwardly, as at 12, and the outer supporting members 11 bend outwardly, as at 13. The outer supporting members 11 are formed such that the bent portions 13 terminate in straight outer end portions 14 transverse or substantially at right angles to the rear end portions of the supports and a rear bumper bar 15 is arranged with its end portions abutting the straight portions 14. Preferably the rear bumper bar 15 is formed substantially midway of its ends with an outwardly directed arcuately bent portion 16 for increasing the resistance of the bar to shocks.

A front bumper bar 17 is formed having rear inwardly directed end portions 18 arranged to overlap and abut end portions of the rear bumper bar 15 and the end portions 14 of the outer supports, and the overlapping end portions of the front and rear bumper bars may be rigidly secured together by nuts and bolts 19 or by any other suitable means. Outwardly of the outer supports 11, the overlapping end portions of the front and rear bumper bars 17 and 15 are preferably additionally secured together by nuts and bolts 20 or by other suitable means. The front bumper bar 17 is formed with rounded ends 21 which terminate in a straight bar portion 22 spaced from and overlying the rear bumper bar 15.

The bent portions 12 of the inner supports 10 terminate in straight end portions 23 from which the rear bumper bar 15 is spaced by plate-like spacer members 24 providing for greater freedom of flexibility of the rounded or bent portions 12 of the inner supports 10. Interposed between the front bumper bar 17 and the rear bumper bar 15 is a pair of spaced resilient individual shock absorbing members 25 which are arranged outwardly of the rear bar bent portion 16 and may be termed the intermediate shock absorbers, in the present bumper structure. These shock absorbers 25 are alike in form and each has a rearwardly positioned base portion 26 abutting the outer surface of the rear bumper bar 15 and overlying the straight end portions 23 of the supports 10. Abutting the rear surfaces of the straight end portion 23, clamping plates 27 are preferably provided and these plates and the rear bumper bar and bases 26 of the shock absorbers 25 may be provided with aligning apertures to receive bolts 28 on which screws may be tightened down to secure the parts rigidly together.

The shock absorbers 25 each include a pair of spaced members 30 which are integral with the base and diverge therefrom toward the front bumper bar 17, the members 30 having spaced inturned portions 31 substantially parallel with the base portions 26. A pair of spaced shock absorbers 32 are positioned forward of and in alignment with the shock absorbers 25 and are arranged for initially receiving and cushioning shocks and for transmitting the cushioned shock to the intermediate shock absorbers which are constructed to give greater resistance to shocks than the shock absorbers 25. The forward shock absorbers 32 are alike and each comprises a strip of metal having a forward abutment portion 33 which extends substantially vertical when the bumper is mounted on a vehicle and terminates in upper and lower bent rounded portions 34 which terminate in inwardly directed straight end portions 35 spaced from and rearwardly of the forward portion 33. To make the outer shock absorbers 26 more resilient for improved cushioning of shocks, the vertical portions 35 are positioned slightly rearward of the forward rounded portions 34a of the upper and lower rounded ends 34, as shown in Fig. 4. As a result of this form of shock absorber, the impact is usually taken by the forwardly projecting upper and lower rounded portions 34 causing the front portions 35 to yield rearwardly and absorb at least some of the shock. The straight end portions 35 of the shock absorbers 26 are spaced from the rear surface of the front bumper bar 17 by a spacer plate 36 which is provided with a forwardly directed recess 37 to receive the front bumper bar 17. A clamping plate 38 is provided for abutment with the outer surface of the front bumper bar 17 at each of the shock absorbers 26, and the plate 38, spacer plate 36 and the end portions 35 of the shock absorbers 26 may be provided with aligning apertures to receive bolts 40 on which nuts 41 may be tightened down to secure the parts rigidly together. The nuts 41 are, in the present instance, provided with shank portions 42 which abut the rear surfaces of the shock absorber end portions 35. The inwardly turned ends 31 of the intermediate shock absorbers 25 abut the rear surfaces of the front shock absorbers 25 and are provided with slots 43 in which the shanks 42 of the nuts 41 are loosely received to permit movement of the end portions 31 toward and away from each other. As shown in Fig. 4, the intermediate shock absorbers 25 are formed such that in their inert or normal form the end portions 31 thereof are closest together with the nut shanks 42 seating in the outer ends of the slots 43. When the end portions receive a force thereagainst, it will be seen that they will move outwardly from each other, and to induce such movement the opposed terminal ends of the portions 31 are bent rearwardly, as at 45.

In the present bumper structure, the front shock absorbers 26 are more flexible and offer least resistance to shocks than the intermediate shock absorbers 25. With this construction small shocks may be totally absorbed by the front shock absorbers 25. However greater shocks are absorbed by the bumper structure as follows. Upon impact, the outer shock absorbers rounded portions 34 yield, bending downwardly and rearwardly, moving portions 35 rearwardly thereby cushioning or absorbing some of the shock. The shock now somewhat diminished in magnitude is transmitted to the intermediate shock absorbers 25, the members 31 of which then yield and move outwardly away from each other to absorb and further diminish the magnitude of the shock. The further diminished shock is then still further diminished by the front and rear bumper bars 17 and 15 and finally by the bent portions 12 of the inner supports 10. Thus it will be seen that the present bumper structure offers increasing resistance to a shock between the points of impact and a vehicle frame such that the force of the shock is gradually decreased or dissipated. The forward shock absorbers project above and below the front bumper bar and thus constitute resilient guards.

What I claim is:

1. In a vehicle bumper structure, a support for mounting the bumper structure on the vehicle, a bumper bar spaced from and carried by said support, a shock absorber disposed outwardly of and secured solely to said bumper bar, and a second shock absorber connecting said first-named shock absorber and said support.

2. In a vehicle bumper structure, a supporting member, a bumper bar spaced from said supporting member, a pair of spaced resilient metallic strips carried by and spaced outwardly of said bumper bar and extending transversely thereof, and a pair of spaced resilient strips positioned respectively in alignment with and back of said first-named resilient strips and extending transversely of said bumper bar, said last named strips being carried by said supporting member and having extended rounded end portions abutting respectively and inwardly of said bumper bar said first-named strips.

3. In a vehicle bumper structure, a main bumper comprising a substantially horizontal resilient, loop-shaped formation having interconnected forward and rearward loop portions spaced apart from one another, a plurality of auxiliary resilient bumpers disposed in laterally spaced relationship along said main bumper, each auxiliary bumper comprising a substantially vertical resilient loop-shaped formation having a forward loop portion spaced forwardly of said forward main bumper portion and an interconnected rearward loop portion disposed adjacent one of said previously mentioned portions of said main bumper, the forward portions of said auxiliary bumpers being yieldable rearwardly into engagement with the forward portion of said main bumper in response to the application of a predetermined force, means for securing the rearward portion of each auxiliary bumper to one of said previously mentioned portions of said main bumper, and means for mounting the main bumper on the vehicle, whereby said auxiliary bumpers will yieldingly absorb minor shocks without permitting engagement with the main bumper and at the same time protect the front of the vehicle in a vertical direction but will yieldingly absorb a portion of a major shock and yield rearwardly to transmit the remainder of the diminished major shock to the forward portion of the main bumper.

4. In a vehicle bumper structure, a main bumper comprising a substantially horizontal resilient, loop-shaped formation having interconnected forward and rearward loop portions spaced apart from one another, a plurality of auxiliary resilient bumpers disposed in laterally spaced relationship along said main bumper, each auxiliary bumper comprising a substantially vertical resilient loop-shaped formation having a forward loop portion spaced forwardly of said forward main bumper portion and an interconnected rearward loop portion disposed adjacent said forward portion of said main bumper, the forward portions of said auxiliary bumpers being yieldable rearwardly into engagement with the forward portion of said main bumper in response to the application of a predetermined force, means for securing the rearward portion of each auxiliary bumper to said forward portion of said main bumper, and means for mounting the main bumper on the vehicle, whereby said auxiliary bumpers will yieldingly absorb minor shocks without permitting engagement with the main bumper and at the same time protect the front of the vehicle in a vertical direction but will yieldingly absorb a portion of a major shock and yield rearwardly to transmit the remainder of the diminished major shock to the forward portion of the main bumper.

JOSEPH A. SCHEUTZ.